United States Patent [19]

Kochevar

[11] 3,782,025
[45] *Jan. 1, 1974

[54] SINKER PUTTY MOUNTING MEMBER
[76] Inventor: Rudolph J. Kochevar, 252 Arbolada Dr., Arcadia, Calif. 91006
[ * ] Notice: The portion of the term of this patent subsequent to Jan. 31, 1989, has been disclaimed.
[22] Filed: Jan. 22, 1973
[21] Appl. No.: 325,424

[52] U.S. Cl. .................................. 43/44.9, 43/43.1
[51] Int. Cl. ............................................. A01k 95/00
[58] Field of Search ................. 43/43.1, 44.89, 44.9

[56] References Cited
UNITED STATES PATENTS
1,618,100  2/1927  Lowry ................................ 43/44.9
2,459,959  1/1949  Pelmarsh ........................... 43/44.89
2,526,031  10/1950  Kocarek ........................... 43/44.9 X
2,599,973  6/1952  Bujaky .......................... 43/44.9 UX
3,638,347  2/1972  Kochevar ....................... 43/44.89 X Primary Examiner—Louis G. Mancene
Assistant Examiner—Daniel J. Leach
Attorney—Gordon L. Peterson

[57] ABSTRACT

A sinker comprising readily manually moldable sinker putty molded on a mounting member attached to a fishing line. The mounting member is configurated to increase the strength of the attachment between the sinker putty and the mounting member and may comprise a sleeve slidable on the line or a plate, stem or piece of twisted wire fixedly attached to the line.

17 Claims, 5 Drawing Figures

PATENTED JAN 1 1974  3,782,025

SINKER PUTTY MOUNTING MEMBER

BACKGROUND OF THE INVENTION

When fishing, it is common practice to apply one or more sinkers to the fishing line to weight the line as necessary so that a portion of the line will sink. The typical sinker is a solid metal member, portions of which can be crimped with an appropriate tool to attach the sinker to the fishing line.

U.S. Pat. No. 3,638,347 which issued to me discloses a novel and advantageous sinker which comprises sinker putty. Sinker putty, as the term implies, is of a readily manually moldable or putty-like consistency. This enables the fisherman to provide a sinker of the desired size and weight at the fishing site and eliminates the need to carry a large assortment of sinkers. No tools are needed to shape or apply the sinker putty, and there is no danger of damaging the fishing line.

SUMMARY OF THE INVENTION

The present invention provides a sinker putty mounting member which permits sinker putty to be used in ways not possible heretofore. For example, it is difficult to mount large amounts of sinker putty on the fishing line as it tends to be cut by the line and fall off. The sinker putty mounting member solves this problem by providing sufficient surface area to avoid cutting of the sinker putty and/or by providing a surface configuration which is adapted to retain the sinker putty.

For example, the mounting member of this invention provides greater surface area per lineal inch than the fishing line with the result that the tendency of the fishing member to cut through the sinker putty is much less than the tendency of a fishing line to cut through the sinker putty. Also, the surface may be configured in various ways to increase the surface area and to interlock the sinker putty and the mounting member. For example, the surface may be configured to form a platform to support the sinker putty or the surface may be irregular or have projections to allow the sinker putty to be molded into and/or around such irregularities to mechanically interlock therewith.

For some fishing purposes, it is desirable to use a sliding sinker, i.e., a sinker which slides along the fishing line. Heretofore, sinker putty could not be used for this purpose. With the present invention, a sinker putty mounting member is provided which allows the mounting member and the sinker putty to slide along the fishing line.

In a preferred construction, such a sliding sinker may include a sleeve mounted on the fishing line for sliding movement therealong and sinker putty mounted on the sleeve. To facilitate mounting of the sleeve on the fishing line, the sleeve preferably has a slot extending between the ends thereof through which the fishing line can be inserted. To prevent the inadvertant removal of the sinker from the fishing line, the slot preferably extends axially and circumferentially and may be, for example, helical. This also reduces substantially the likelihood that the fishing line can exert cutting forces on the sinker putty through the slot. The external peripheral surface of the sleeve may have one or more irregularities to increase the mechanical attachment between the sinker putty and the sleeve. For example, the sleeve may have radially enlarged end portions and at least a portion of the sinker putty can be mounted on the sleeve between such enlarged end portions.

The invention can best be understood by reference to the following description taken in connection with the accompanying illustrative drawings.

DESCRIPTION OF THE PREFERRED EMBODIMENTS

Figure 1:
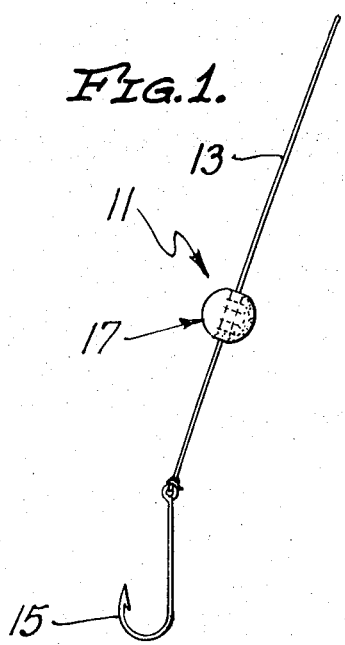
FIG. 1 is a fragmentary side elevational view of a portion of a fishing line assembly with a sliding sinker constructed in accordance with the teachings of this invention mounted on the fishing line.
Figure 2:
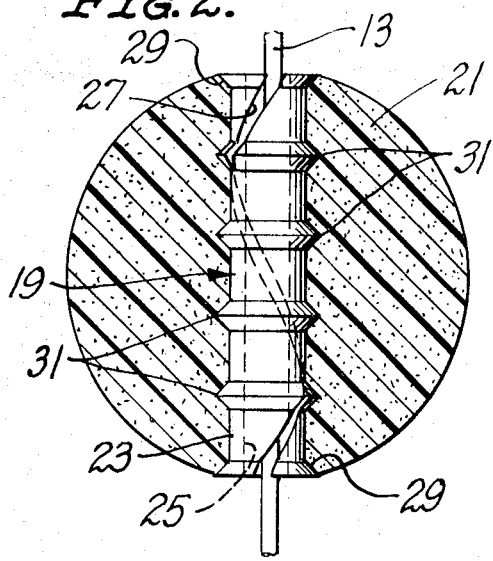
FIG. 2 is an enlarged view of the sliding sinker with the sinker putty being shown in section.

FIGS. 1 and 2 illustrate a fishing line assembly 11 constructed in accordance with the teachings of this invention. The fishing line assembly includes a fishing line 13, a fishing hook 15, and a slidable sinker 17, constructed in accordance with the teachings of this invention. The fishing line assembly 11 may also include numerous conventional items of fishing equipment not illustrated, such as a rod, a reel, a leader, and the like. The fishing line 13 and the fishing hook 15 can be of any kind as the present invention is not restricted to any particular type or arrangement of fishing tackle.

The slidable sinker 17 includes a tubular member in the form of a sleeve 19 and sinker putty 21 molded around the sleeve. The sleeve 19 may be constructed of metal or plastic. In the embodiment illustrated, the sleeve 19 has a peripheral wall 23 defining a passage 25 which extends through the sleeve. A slot 27 extends completely through the peripheral wall 23 from one end of the sleeve 19 to the other. The slot 27 has a width which is sufficient to allow the fishing line 13 to be forced therethrough into the passage 25. To help prevent inadvertent removal of the sleeve 19 from the fishing line 13, the slot 27 preferably extends both axially and circumferentially of the sleeve 19. In the embodiment illustrated, the slot 27 is helical.

The sleeve 19 has enlarged end portions or annular enlargements 29 at the opposite ends thereof. The radial enlargements 29 may be formed, for example, by outward flaring of the end portions of the sleeve 19 when the latter is constructed of metal or by molding if the sleeve 19 is constructed of plastic. The sleeve 19 may also have radial projections 31 which extend radially outwardly intermediate the enlargements 29 to provide an irregular surface on the sleeve 19. Although these projections can take different forms, in the embodiment illustrated, each of them is in the form of an annular rib.

The sinker putty 21 may be of various different compositions provided that it is readily manually moldable, heavier than water, and will not dissolve or wash away when in use in the water. A preferred composition for the sinker putty 21 includes particulate matter such as powdered metal held together with a binder. For example, the metal may be powdered lead and the binder may be any deformable material which will hold the particulate material together. The binder should be readily manually deformable and must not be soluble in water. The quantity of the binder must be sufficient to bind together all of the particulate matter. The sinker putty 21 is preferably somewhat sticky and tends to adhere to the sleeve 19. Suitable sinker putty compositions are disclosed in U.S. Pat. No. 3,638,347.

In use of the fishing line assembly shown in FIG. 1, the sleeve 19 is mounted on the fishing line 13 for sliding movement thereon by forcing of the line through the slot 27. Because the slot 27 extends both axially and circumferentially, there is virtually no likelihood that the sleeve 19, once installed, will be separated from the fishing line 13. A mass of the sinker putty 21 is then manually molded around the sleeve 19. The amount of the sinker putty employed will depend upon the weight required for the particular fishing operation. In the embodiment illustrated, the sinker putty 21 is provided in a mass which extends between the radial enlargements 29 and extends completely around the sleeve 19. The sinker putty 21 also serves to close the slot 27 to further reduce the likelihood that the sleeve 19 will become separated from the fishing line 13.

The sleeve 19 serves several important functions. First, the outer peripheral surface area of the sleeve 19 is much greater than the surface area of a corresponding length of the fishing line 13. This enables a much larger mass of the sinker putty 21 to be mounted on the sleeve 19 without danger of cutting than could be mounted directly on the fishing line 13. In addition, this larger surface area increases the area of contact and hence the tendency of the sinker putty 21 to bond or adhere to the sleeve 19. The radial enlargements 29 mechanically interlock with the sinker putty 21 to firmly mount the sinker putty 21 on the sleeve. The projections 31 also serve to mechanically interlock with the sinker putty 21. Accordingly, a relatively large mass of the sinker putty 21 can be mounted, if desired, on the sleeve 19.

Figure 3:
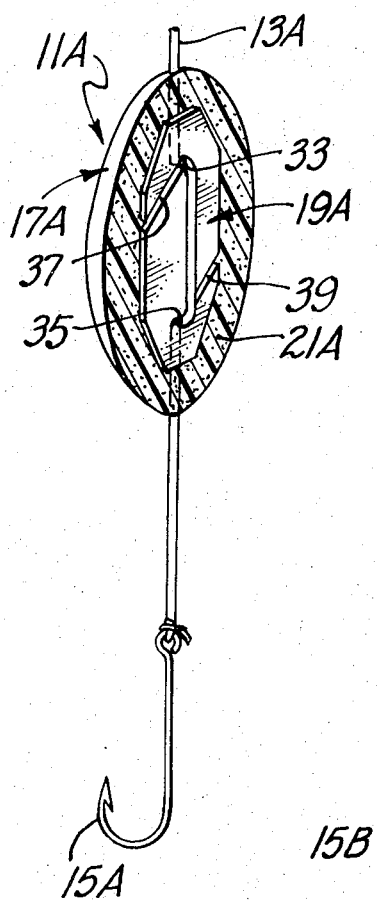
FIG. 3 is a perspective view of a fishing line assembly employing a second form of sinker putty mounting member constructed in accordance with the teachings of this invention. The sinker putty is shown in section.
Figure 4:
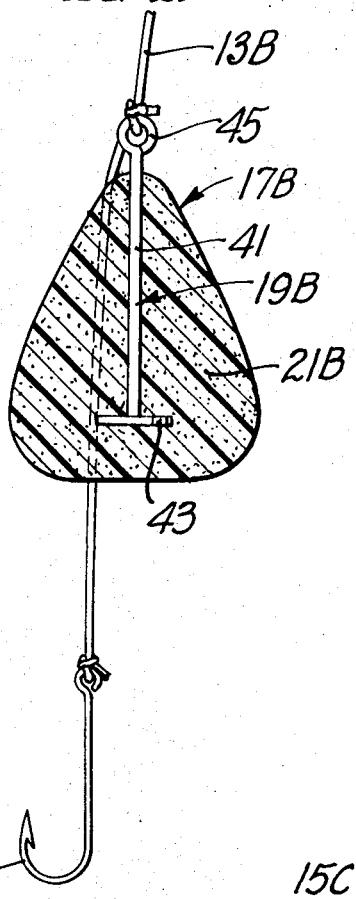
FIG. 4 is an elevational view of a fishing line assembly employing a third form of sinker putty mounting member with the sinker putty being shown in section.
Figure 5:
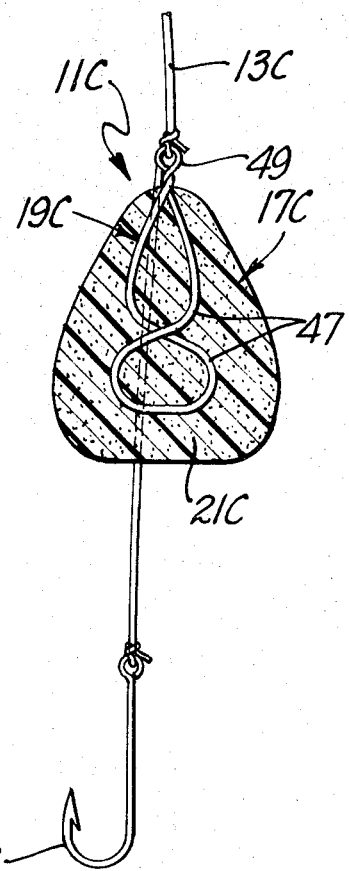
FIG. 5 is an elevational view partially in section of a fishing line assembly employing a fourth form of sinker putty mounting member with the sinker putty being shown in section.

FIGS. 3-5 show fishing lie assemblies 11A, 11B, and 11C, each of which includes a different mounting member for sinker putty. The fishing line assemblies 11A, 11B, and 11C are identical to the fishing line assembly 11 in all respects not specifically shown or described herein. Generally each of the fishing line assemblies 11A, 11B, and 11C is not slidable along the fishing line as is the fishing line assembly 11, but rather these fishing line assemblies are fixedly mounted on the fishing line. A primary purpose of each of the fishing line assemblies 11A, 11B and 11C is to allow a relatively large mass of the sinker putty to be employed, and to thereby provide a heavier sinker. In FIG. 3, the fishing line assembly 11A includes a fishing line 13A, a fish hook 15A, and a sinker 17A. The sinker 17A includes a mounting member 19A and sinker putty 21A. The fish hook 15A is tied to the end of the line 13A.

The mounting member 19A is in the form of a flat plate having openings 33 and 35 adjacent the opposite ends thereof and slots 37 and 39 which extend from the openings 33 and 35, respectively, toward the periphery of the mounting member 19A. In the embodiment illustrated, the slots 37 and 39 are inclined toward the openings 35 and 33 respectively. The mounting member 19A is firmly held on the line 13A so that the sinker 17A does not dangle from the fishing line.

In use, the fishing line 13A is inserted through the slots 37 and 39 into the openings 33 and 35. The mounting member 19A is, therefore, mounted to the fishing line 13A adjacent both ends of the mounting member. A mass of the sinker putty 21A is then manually molded over all or a portion of the mounting member 19A. In the embodiment illustrated, the sinker putty 21A is molded completely around, and over the full length of, the mounting member 19A.

The fishing line assembly 11B (FIG. 4) includes a fishing line 13B, a fish hook 15B attached to one end of the fishing line, and a sinker 17B suitably attached to the fishing line. The sinker 17B includes a mounting member 19B and a mass of sinker putty 21B. A primary function of the mounting member 19B is to provide appropriate configuration for mounting a relatively large mass of the sinker putty 21B and to allow the sinker 19B to dangle from the fishing line 13B.

The mounting member 19B includes a stem 41 and a disc or platform 43 which forms an enlarged end portion at the lower end of the stem. Although the platform 43 could be in the form of radially extending arms, in the embodiment illustrated, it is in the form of a continuous circular disc which is perpendicular to, and coaxial with, the stem 41. An eyelet 45 is formed at the upper end of the stem 41 to allow the mounting member 19B to be attached to the fishing line 13B. The stem 41 and the eyelet 45 may be formed, for example, of wire. Alternatively, the mounting member 19B may be molded from a suitable plastic material.

In use, the mounting member 19B is appropriately affixed to the fishing line 13B as by extending the fishing line through the eyelet 45 and providing a suitable knot. A mass of the sinker putty 21B of appropriate size is then manually molded around the stem 41 and the platform 43 as shown by way of example in FIG. 4. The sinker 17B is then free to dangle from the line 13B.

The fishing line assembly 11C includes a fishing line 13C, a fish hook 15C attached to the end of the fishing line, and a sinker 17C. The sinker 17C includes a mounting member 19C and sinker putty 21C. The mounting member 19C may be constructed of twisted wire or molded plastic material. The mounting member 19C includes a plurality of loops 47 and an upper loop 49 forming an eyelet.

In use, the mounting member 19C is attached to the fishing line 13C at the eyelet 49 in the same manner described with reference to FIG. 4. A mass of the sinker putty 21C is then manually molded completely around the loops 47. This provides additional surface for attaching the sinker putty 21C to the mounting member 19C and also provides for a mechanical interlock between the sinker putty and the mounting member. Thus, the mounting member 19C allows a large mass of the sinker putty 21C to be used and allows the sinker 17C to dangle from the line 13C.

Although exemplary embodiments have been shown and described, many changes can be made without departing from the spirit of this invention.

I claim:

1. In a fishing line assembly including a fishing line, a hook attached to the fishing line with the hook being adapted to catch fish, the improvement comprising:

a sinker putty mounting member attached to the fishing line and adapted to have sinker putty mounted thereon; and manually moldable sinker putty on said mounting member, said mounting member being attached to the fishing line at a location to allow the sinker putty to cause at least a portion of the fishing line assembly to sink when in use.

2. An improvement as defined in claim 1, wherein said mounting member includes first and second sections extending in first and second directions, respectively, said directions being different whereby the sinker putty can be interlocked with said mounting member.

3. An improvement as defined in claim 1, wherein said mounting member includes a plurality of surface irregularities to facilitate the formation of a mechanical interlock between said mounting member and the sinker putty.

4. An improvement as defined in claim 1, wherein said mounting member includes at least one enlarged end portion.

5. An improvement as defined in claim 1 wherein said mounting member includes a plate having first and second openings through which the fishing line extends and first and second slots extending, respectively, from said first and second openings to the periphery of the plate, said sinker putty being on said plate.

6. An improvement as defined in claim 1 wherein said mounting member includes a stem attached to the fishing line member and a platform extending generally transverse to said stem, said stem and said platform cooperating to retain the sinker putty.

7. An improvement as defined in claim 1 wherein said mounting member includes means mounted on said fishing line for sliding movement therealong, said sinker putty being attached to said means.

8. An improvement as defined in claim 7 wherein said means includes a sleeve slidable along the fishing line.

9. An improvement as defined in claim 8 wherein said means includes at least one radial projection on said sleeve.

10. An improvement as defined in claim 8 wherein said sleeve has a slot therein to receive the fishing line.

11. An improvement as defined in claim 10 wherein said slot extends axially and circumferentially of the sleeve to prevent inadvertant withdrawal of the fishing line from the sleeve.

12. An improvement as defined in claim 8 wherein said sleeve has a helical slot therein and first and second radial enlargements adjacent the opposite ends thereof, said sinker putty being molded around said sleeve with at least a portion of the sinker putty being between said radial enlargements.

13. An improvement as defined in claim 1 wherein said sinker putty includes particulate metal substantially heavier than an equivalent volume of water held together by a binder, said binder being readily deformable at least at the time that the sinker putty is mounted on said mounting member to thereby facilitate the mounting of the sinker putty on the mounting member.

14. A device for making a slidable sinker utilizing sinker putty comprising:

a generally tubular member having a passage therethrough, said tubular member having a peripheral wall, said tubular member having an outer surface on which the sinker putty can be placed;

said tubular member having a slot in said peripheral wall providing communication through the peripheral wall to said passage; and at least one radial outward projection on the tubular member to assist in retaining the sinker putty on the tubular member.

15. A device as defined in claim 14 wherein said slot extends both axially and circumferentially of the tubular member.

16. A device as defined in claim 14 wherein said slot extends between the opposite ends of the tubular member and at least a portion of said slot is generally helical, said projection including an enlarged end portion at one end of said sleeve, said tubular member having radially enlarged end portions at the other end of the tubular member.

17. An improvement as defined in claim 1 wherein said mounting member defines at least one loop, said sinker putty being molded around said loop.

* * * * *